June 11, 1929.  C. S. BUSHNELL  1,717,331
TRAIN CONTROL SYSTEM FOR RAILROADS
Original Filed Jan. 26. 1922   2 Sheets-Sheet 1
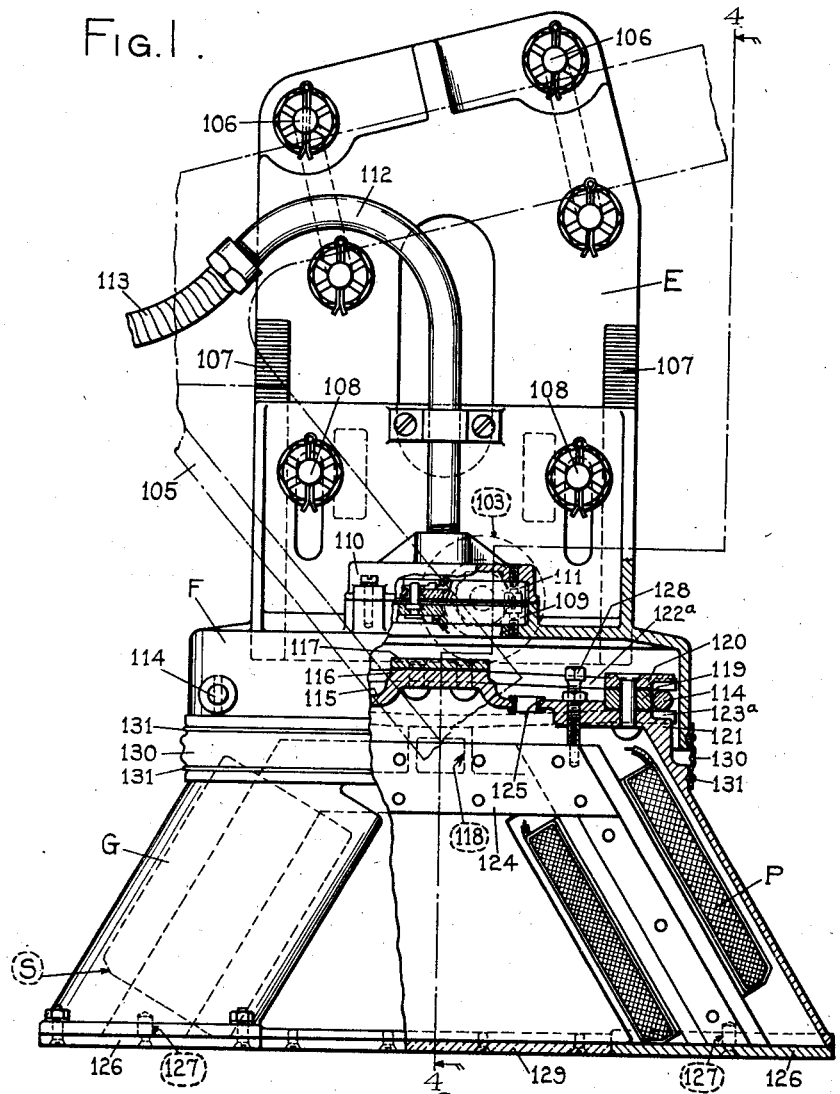
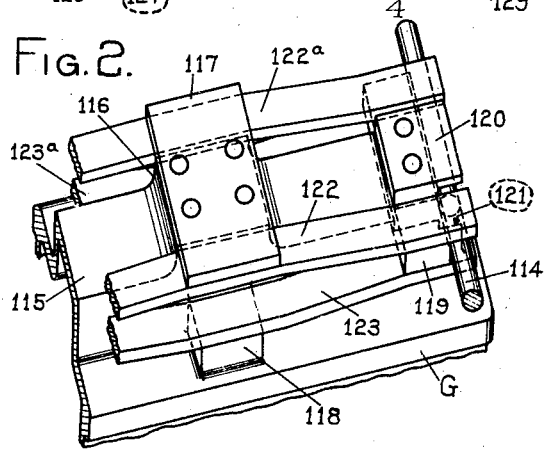
INVENTOR
C. S. Bushnell
BY
Neil D. Preston,
his ATTORNEY June 11, 1929.   C. S. BUSHNELL   1,717,331
TRAIN CONTROL SYSTEM FOR RAILROADS
Original Filed Jan. 26, 1922   2 Sheets-Sheet 2

INVENTOR
C. S. Bushnell,
BY
Neil D. Preston,
his ATTORNEY

Patented June 11, 1929.

1,717,331

UNITED STATES PATENT OFFICE.

CHARLES S. BUSHNELL, OF ROCHESTER, NEW YORK, ASSIGNOR TO GENERAL RAILWAY SIGNAL COMPANY, OF ROCHESTER, NEW YORK.

TRAIN-CONTROL SYSTEM FOR RAILROADS.

Original application filed January 26, 1922, Serial No. 531,903. Divided and this application filed November 22, 1926. Serial No. 150,131.

This invention relates in general to receivers for use in automatic train control systems, and has more particular reference to an improved means for mounting and supporting receivers in operative position on railway vehicles.

The present application is a division of my co-pending application, Ser. 531,903 filed Jan. 26, 1922, for train control systems for railroads.

In mounting receivers on railway vehicles, it may be considered preferable to mount them on the vehicle trucks rather than on the bodies, in order to have the receivers fixed to parts which bear an invariable spaced relation to the track, so as to avoid too great changes in the distance between the receivers and fixed, cooperating, trackway inductors. At the same time, it is desirable to protect the receivers from shock by means of cushioning support means permitting only very limited motion of the receivers relative to their supports.

With the above and other objects in mind, it is proposed, according to this invention, to provide a mounting for receivers of the character set forth above, fulfilling the above requirements.

Further objects, purposes, and characteristic features of this invention will appear as the description progresses, reference being had to the accompanying drawings, given solely by way of example, and wherein:

Fig. 1 is a side view of one form of a car element and its support, parts being broken away and shown in section for clearness;

Fig. 2 is a fragmentary diagrammatic perspective view showing features of the construction of the spring mounting for the car element shown in Fig. 1;

Generally stated, the car element and mounting comprises a supporting bracket firmly connected in some suitable manner to some part of the vehicle, preferably the car truck, side frame, pony truck or similar part having a definite spaced relation to the track; a hood or hanger adjustably supported on the supporting bracket; and the car element itself housed in a suitable non-magnetic casing and spring supported from the hanger, a flexible skirt or apron, connecting the housing of the car element and the hanger, being provided to keep out snow, ice, moisture and weather generally.

Figure 3:
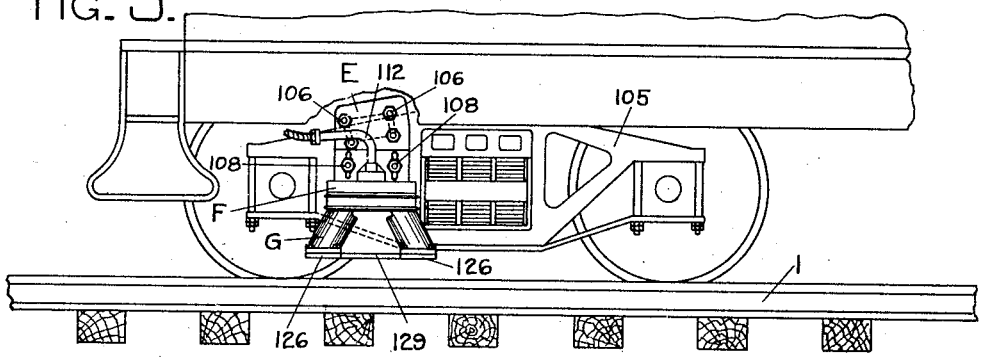
Fig. 3 illustrates one typical application of the car element to a conventional construction of car truck.
Figure 4:
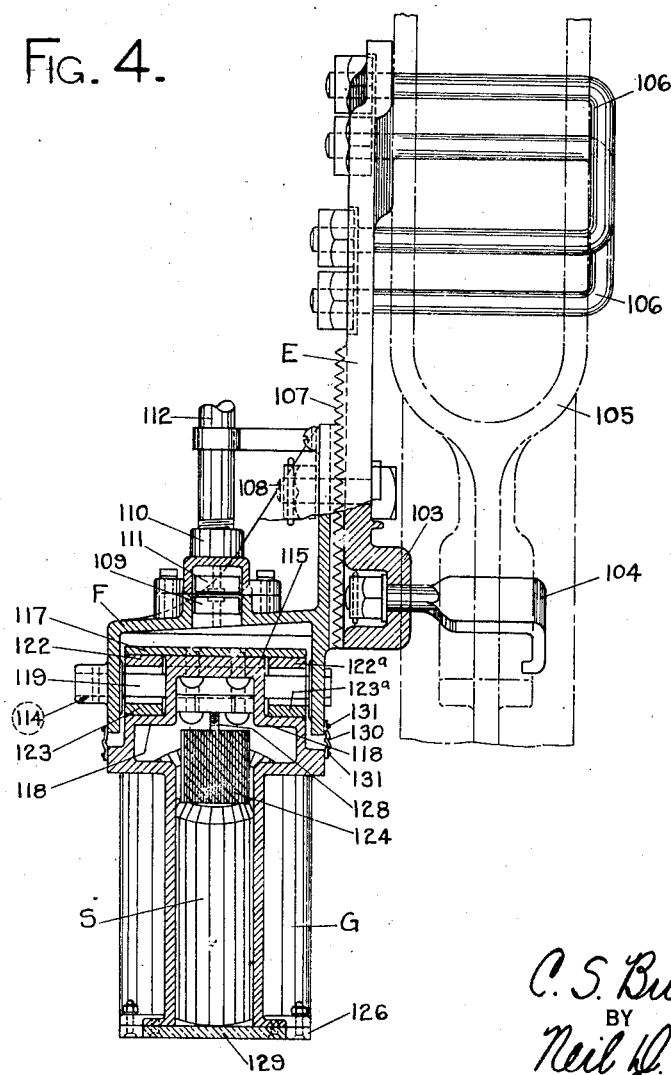
Fig. 4 is a vertical longitudinal section through the car element, taken on the line 4—4 of Fig. 1.

More specifically, and referring to the drawings, the supporting bracket E is of a general flat shape and is provided near the middle, toward the bottom end, with a hollow boss 103 containing a nut for anchoring a hook bolt 104, which is hooked about the side frame 105 of the car truck, as most clearly illustrated in Fig. 4. The top portion of the supporting bracket E is provided with holes to receive U bolts 106 extending around the top brace of the side frame 105 of the car truck. The lower front face of the bracket E is formed with saw tooth ridges 107. To this supporting bracket E, the hood or hanger F, which is provided with similar saw tooth ridges engaging the ridges 107 of the bracket, is clamped by bolts 108 passing through slots in the hanger (see Fig. 1) and having heads in recessed bosses integral with the back of bracket E (see Fig. 4) thus providing a firm connecting means between these two devices which allows a vertical adjustment of the car element with respect to the truck.

This hanger F is preferably cast of non-magnetic material, such as manganese steel, in the general form of an inverted rectangular box-like casing having an integral vertical flange which is bolted to the bracket E. The hanger F is provided at the top with an opening of rectangular shape and is surrounded by upstanding flanges forming walls of a pocket in which is fastened a terminal board 109 of insulating material. This terminal board 109 is provided with plugs made of conducting material forming the male members of a quick detachable connector. Over this connector pocket is screw-fastened a cap 110 provided with an insulating terminal board 111 containing the female members of said connector. The top of this cap 110 is bossed and pipe-threaded to firmly hold the conduit pipe 112 for carrying the lead-in wires from the top terminal board 111 of the quick detachable connector. These wires are carried from the rigid conduit 112 to the car body by a suitable flexible conduit 113, as illustrated. The bottom part of the hood or hanger F is hollow to receive the car element casing G; and near each end of the hood or hanger are bosses for receiving two cross pins 114, these cross pins being locked in place by small transverse pins (see Fig. 1).

The car element casing G comprises a casting of non-magnetic material, such as aluminum or manganese steel, of a shape to closely fit about the yoke and coils of the car element illustrated, and has its middle portion flattened to the thickness of the yoke. The top part of the car element casing G is provided with a longitudinal raised rib 115, as more clearly illustrated in the fragmentary perspective view shown in Fig. 2. The middle of this raised rib 115 is raised further to form a boss 116, across which is riveted a retaining plate 117 of a length to project beyond each side of the raised rib 115. Directly below the ends and on each side of the retaining plate 117, the casing G is provided with projections 118 forming shoulders. Near each end of the raised rib 115 of the casing is riveted a stop bar 119, which extends on each side of said raised rib, substantially the same distance as the retaining plate 117. The rivets for fastening the stop bar 119 also pass through a plate 120 provided with an extending lip projecting over the pin 114 and forming a top limiting stop. The car element casing G has a projecting lug 121 cast integral therewith and disposed directly under the extending lip of the plate 120, thus forming a bottom limiting stop.

By looking at the fragmentary perspective view in Fig. 2, and bearing in mind that the left hand end, which is identical with the right hand end, has been omitted, it will be noted that, if a flat spring 122 (which tends to bow up and is straightened considerably as it is inserted) is positioned to have its ends bear on top of the stop bars 119 and its middle portion bearing under the retaining plate 117, the spring 122 will be under initial tension. Likewise, if another such spring 123, turned with its convex side downward, is inserted to have its ends rest under the stop bars 119 and its middle portion rest on top of the shoulder 118, another initially tensioned spring is thus provided. The back side of the car element casing is provided with similar springs 122ª and 123ª. This car element casing G is inserted into the bottom end of the hood F, and the pins 114, which are of substantially the same diameter as the thickness of the stop bars 119, are passed between the ends of the initially tensioned springs 122 and 123. The ends of the stop bars 119 are arranged to strike raised surfaces on the inside of the hood F (see Fig. 4) and limit sidewise movement of the casing G with respect to the hood F.

The yoke 124 of the car element is of general U shape, as shown, having its back yoke portion of rectangular cross section and constructed of a good quality of laminated transformer iron, and having its legs of cruciform cross section, this cross section being formed by narrow laminations riveted to the main lamniations of the legs. In assembling, the yoke 124 is passed into the casing G, the middle portion of the casing being just wide enough to allow it to pass into the same. The lead-in wires are then passed into the casing and up through the grommets or insulating bushings 125 (only one of which is shown) and up to the terminal board 109 of the quick detachable connector. The primary and secondary coils P and S are then passed over the legs of the yoke 124, and iron pole pieces 126 are bolted against the casing by bolts with countersunk heads, as shown. Dowel pins 127, riveted into the pole pieces 126, fit in holes provided in the ends of the legs. After these pole pieces 126 are tightly drawn up against the casing G, the retaining screws 128 (only one of which is illustrated) are tightened and locked by the lock nut shown. In order to completely close up the bottom of the casing G, a non-magnetic plate 129, preferably of heavy fiber, wood, or other insulating material, is screw-fastened to the casing between the pole pieces, as illustrated. If desired, the casing G may be filled with suitable insulating compound which, after it sets, holds the coils and lead wires firmly.

Assume a railway vehicle provided with the car element and mounting just described, is moving along at a high velocity. When passing over fairly smooth and well ballasted trackway, the initially tensioned springs will bear against the stop bar continuously and support the car element rigidly; but if an unusual jar should occur, let us say tending to move the car element downward, the top springs 122 and 122ª will be further flexed allowing the car element and casing G to move downward with respect to the hood F. If a similar jar occurs tending to move the car element upward, the bottom springs 123 and 123ª will be further flexed allowing such movement.

In train control systems of the inductive type, it is important to carry the car element in such a way as to maintain a small and uniform air gap spacing with respect to the track elements. For this reason, it is preferred to support the car element from the truck side frame or the like, rather than the spring supported car body; but when this is done, it is desirable to provide a spring mounting for the car element to protect it from injury by the severe pounding and shocks to which it is subjected. Springs under initial tension are employed to maintain the car element in the desired position until subjected to a jolt or jar of a magnitude that might injure it. The strength of the springs is selected to avoid displacement of the car element enough to affect the working air gap under jars of a magnitude ordinarily encountered. It should be noted that the upper and lower springs are separately flexed as the car element is displaced in a corresponding direction from its neutral position; and while the springs are maintained under any desired amount of initial tension, they do not act against each other, or follow up, but serve to return the car element to its neutral position after each displacement without bobbing or vibratory disturbances. In short, the initially tensioned springs with the stops, afforded by stop bars 119 and pins 114, maintaining the car element in the desired position, with desired air gap, and also protected from injury. The spring mounting shown and described allows transverse oscillation as well as vertical up and down movement.

The "wash-board" adjustment of the casing G with respect to the bracket E allows the car element to be raised or lowered to compensate for variations due to wheel wear or substitution of new wheels. The detachable connector allows removal of the entire car truck from under the car body, without disconnection of wires, the parts of the connector being constructed so that they can not be united except in the right way to make the proper circuit connections.

*Rail interference.*—In the type of inductive train control system in which a controlling influence is produced on the car by virtue of the magnetic properties of a track element, it will be evident that a similar effect will be produced by other magnetic bodies along the trackway, such as switch points and track rails at crossings, water pans, switch stands, and the like. Since a track element is purposely constructed of iron laminated to avoid the weakening effect of eddy currents it will, of course be superior, in changing the reluctance of a partial magnetic circuit on the car, to track rails and like magnetic bodies ordinarily encounted along a railway track.

When the track elements, however, are located between track rails, their upper surfaces must necessarily be on a level with, or somewhat below, the tops of the track rails, in order to avoid being struck by low hanging parts of vehicles; and these limitations, more particularly if it be attempted to keep the space between the track rails clear for the flanges of snow plows, makes the working air gap between the regular track element and the car element greater than between a track rail and said car element, with the result that the track rail has an advantage, so to speak, over the track element with respect to the air gap, and may under unfavorable conditions cause a false or unnecessary operation of the train control apparatus.

While various expedients may be employed to neutralize or minimize this rail interference, in accordance with the present invention it is proposed to dispose the track elements outside of the track rails, in order that they may have their pole pieces elevated some distance above the plane of the tops of the running track rails. With this disposition of track elements, the car element being of course located accordingly, the working plane of the car and track elements is considerably above the level of the track rails, so that the track rails and other magnetic bodies are at a disadvantage both as to air gap and to magnetic qualities and under ordinary working conditions will not produce an influence that is objectionable. While various specific arrangements and relative dispositions of the track and car elements may be employed in practice, one typical organization which has been found adaptable to an established clearance diagram for the railroads in this country consists of mounting the car and track elements with their center lines 19 inches outside of one or the other of the running rails, and with their working plane or center of the air gap 2½ inches above the level of the top of the running rails.

Assuming now that an exceptional jar should occur, either the top or bottom spring would be flexed to its limit, that is, to such an extent that either the top or bottom limiting stop (depending upon the direction of the jar) would strike the pins 114, thus allowing no further relative movement between the casing and hood. These limit stops are provided to limit the movement of the car element with respect to the truck of the vehicle, so that the car element can not jar out of place in one direction to an extent to strike track element, or in the other direction to an extent to get out of the range of influence of a track element. If desired, these limiting stops may comprise another set of initially tensioned springs, rubber, or like buffing means.

Since in the present device the car element and the hood will move with respect to each other when jars and vibrations occur, and since it is desirable to protect the initially tensioned spring device, as well as the coils and lead-in wires from snow, ice, and moisture, a yieldable means for protecting these devices from the weather has been provided. In the particular form illustrated, this means comprises a skirt or apron 130 of canvas, or similar material, fastened by drawing it into grooves in the hood and casing, respectively, by suitable binding means, such as wires 131, or the like.

The above specific description of a device embodying this invention is given solely by way of illustration and is not intended, in any manner whatsoever, in a limiting sense. Obviously, this invention can assume many different physical forms, and is susceptible of various modifications, and all such forms and modifications are desired to be included by this invention, as come within the scope of the appended claims.

Having described my invention I now claim:—

1. A receiving device for inductive automatic train control systems, comprising, a non-magnetic casing, a substantially U-shaped core of magnetic material, adjustable clamp means for rigidly clamping said core in said casing, a winding on said core, and means for adjustably securing said device to a railway vehicle.

2. A receiving device for inductive automatic train control systems, comprising, a non-magnetic casing having depending legs, a magnetic core mounted within said casing, a coil on said core within each of said depending legs, an upwardly extending supporting plate connected to said casing, and means on said plate for permitting said device to be adjustably secured to a support.

3. A receiving device for inductive automatic train control systems, comprising, a non-magnetic metallic casing having an enlarged hollow portion of inverted U-shape, pole pieces secured to the ends of said enlarged hollow portion, and a U-shaped core of magnetic material connected to said pole pieces within said casing, and a coil on said core.

4. In combination with a railway vehicle having a truck frame secured to a journal box, a receiving device for inductive automatic train control systems, comprising, a magnetic core having a coil thereon and mounted within a non-magnetic casing, means clamping said core in said casing, a supporting plate resiliently mounted on said casing, a bracket rigidly secured to said truck frame adjacent said journal box, and means on said plate and on said bracket for permitting vertical adjustment between said receiving device and said railway vehicle.

5. A car element for receiving control influences from track elements having the magnetic properties of iron when in their influence transmitting condition, and means for resiliently supporting said car element for limited movement in a vertical plane, from the vehicle, at such a distance above intersecting crossing rails as to not receive a control influence from crossing rails and the like.

6. A car element for receiving control influences from track elements having the magnetic properties of iron when in their influence transmitting condition spring suspended from the vehicle at such a distance above intersecting crossing rails as to not receive a control influence therefrom; said spring suspension comprising, opposed initially tensioned springs holding said element in a predetermined relation to the track and having stops so that one spring can not follow up the other when said other spring is further tensioned by movement of said car element due to jars and vibration.

7. A spring suspended car element for automatic train control systems comprising, a supporting bracket, a car element consisting of a core of magnetic material having a coil thereon, and means for supporting said car element from said bracket comprising, a plurality of initially tensioned springs tensioned to urge said element in opposite directions, and stops for preventing said springs from moving further than their normal position in the direction in which they are biased as said element is jarred out of its normal position.

8. In a spring suspended car element, the combination of a supporting bracket, a car element comprising a core having a winding thereon, spring means for supporting said element from said bracket, and a flexible apron extending from said bracket to said element around said spring means.

9. In a receiver for automatic train control, a non-magnetic casing, core and coil structure in the casing, a bracket fixed to a railway vehicle, a hanger adjustably connected to the bracket, interengaging toothed surfaces on the bracket and hanger, and a resilient connection between the hanger and casing.

10. In a receiver for automatic train control, a non-magnetic casing, core and coil structure in the casing, a bracket fixed to a railway vehicle, a hanger adjustably connected to the bracket, interengaging toothed surfaces on the bracket and hanger, a resilient connection between the casing and the hanger, and rigid cooperating stop members positively limiting relative motion between the casing and hanger in opposite directions.

11. In a receiver for automatic train control, a non-magnetic casing containing a coil and core structure, a hanger resiliently connected to the casing, a bracket fixed to a railway vehicle, and means to adjustably connect the hanger to the bracket.

12. In a receiver for automatic train control, a non-magnetic casing containing a coil and core structure, a hanger resiliently connected to the casing, a bracket fixed to a railway vehicle, and bolt and slot means to adjustably connect the hanger to the bracket.

13. In a receiver for automatic train control, a non-magnetic casing containing a coil and core structure, a hanger resiliently connected to said casing for limited relative motion, a bracket fixed to a railway vehicle, bolt and slot means to adjustably connect the hanger to the bracket, and interengaging teeth on the hanger and bracket to aid in holding such members in set position.

14. A receiver for inductive train control systems, comprising, a core and coil structure, a non-magnetic casing containing said structure, a hanger connected to said casing, a support bracket carried by a car frame, means for adjustably connecting said hanger to said bracket, a terminal box on said hanger, and a quick detachable coupler in said box for connection of lead in wires for the coil structure.

In testimony whereof I affix my signature.

CHARLES S. BUSHNELL.